(12) United States Patent
Byerly

(10) Patent No.: US 6,315,330 B1
(45) Date of Patent: Nov. 13, 2001

(54) APPARATUS HAVING HYDRAULIC PRESSURE LOADED QUICK DISCONNECT

(75) Inventor: David J. Byerly, Lawrenceville, GA (US)

(73) Assignee: Nordson Corporation, Westlake, OH (US)

( * ) Notice: Subject to any disclaimer, the term of this patent is extended or adjusted under 35 U.S.C. 154(b) by 0 days.

(21) Appl. No.: 09/429,907

(22) Filed: Oct. 29, 1999

(51) Int. Cl.⁷ .................................................. F16L 37/28
(52) U.S. Cl. ....................... 285/18; 285/83; 285/306; 285/125.1; 285/305; 285/124.1
(58) Field of Search ................... 285/18, 83, 95, 285/124.1, 124.5, 125.1, 305, 306, 900

(56) References Cited

U.S. PATENT DOCUMENTS

| | | | |
|---|---|---|---|
| 2,861,821 | * 11/1958 | Harter | 285/306 |
| 3,017,907 | * 1/1962 | Quail et al. | 285/306 |
| 3,538,940 | * 11/1970 | Graham | 285/306 |
| 4,056,145 | * 11/1977 | Jett et al. | 285/306 |
| 4,371,004 | * 2/1983 | Sysolin | 285/306 |
| 4,543,995 | * 10/1985 | Weh et al. | 285/306 |
| 4,880,257 | * 11/1989 | Holbert, Jr. | 285/900 |

FOREIGN PATENT DOCUMENTS

| 1287480 | * 2/1962 | (FR) | 285/306 |
|---|---|---|---|

* cited by examiner

Primary Examiner—Eric K. Nicholson
(74) Attorney, Agent, or Firm—Wood, Herron & Evans, L.L.P.

(57) ABSTRACT

Liquid dispensing apparatus having a pressure loaded quick disconnect assembly. The apparatus includes a first liquid containing component having at least one liquid passage, a second liquid containing component including at least one liquid passage, a movable connecting member having portions contained in the passages of the first and second liquid containing components, and a force transmitting member connected with the movable connecting member. The force transmitting member directs force against the first liquid containing component when the liquid passages of the first and second liquid containing components contain the pressurized liquid. This securely connects the first and second liquid containing components together using force generated by the internal pressurized liquid. When the pressure is removed, the force transmitting member may be quickly removed to disconnect the components.

23 Claims, 3 Drawing Sheets

APPARATUS HAVING HYDRAULIC PRESSURE LOADED QUICK DISCONNECT

FIELD OF THE INVENTION

The present invention generally relates to apparatus for containing and, more preferably, dispensing pressurized liquids. More specifically, the invention relates to the connection made between two liquid containing components which receive the pressurized liquid.

BACKGROUND OF THE INVENTION

Components containing and distributing pressurized liquids, such as adhesive gun manifolds and extrusion manifolds, must be fastened together to provide a fluid path for the liquid and to retain the liquid under higher than atmospheric pressure. In certain applications, these manifolds or blocks either include integrated outlets, such as nozzles, slots or orifices, or include attached gun modules, valves or other components to facilitate a dispensing operation. Such components, herein referred to as liquid containing components, are generally fastened together with threaded fasteners, such as screws or bolts.

Conventional fastening methods for liquid containing components require specific torque values to maintain the integrity of the threads and to allow for thermal expansion of the various components. Threads can also become damaged and, in the case of an internal thread in a manifold block, for example, may involve an expensive replacement of the threaded part. Also, attaching and removing the threaded fasteners, for example, during maintenance, repair or replacement of a liquid containing component or other component is a time consuming operation. Additionally, the mated liquid containing components usually require a compression-loaded seal, such as a face seal, to contain the liquid within the connected liquid containing components.

To overcome problems such as these in the general area of pressurized liquid containment and, more specifically, in dispensing technology, there is a need for manners of connecting two liquid containing components together without requiring threaded fasteners or other similarly disadvantaged fastening systems.

SUMMARY OF THE INVENTION

The present invention generally provides apparatus for containing pressurized liquid and incorporating a pressure loaded quick disconnect assembly. In a general aspect, the invention provides a hydraulic pressure-operated connector for two components which are in fluid communication. In a more specific aspect, the hydraulic pressure-operated connector may also facilitate the fluid communication, or transfer of liquid, between the two components. In each case, the hydraulic pressure-operated connector is used to easily connect and disconnect the two liquid containing components for such purposes as maintenance, repair and replacement.

Generally, apparatus constructed in accordance with the invention includes a first liquid containing component having a first passage and a second liquid containing component which is in fluid communication with the first liquid containing component when the liquid containing components are in connected relation as described below. The second liquid containing component includes a second passage. A movable connecting member includes first and second portions respectively contained in the first and second passages. The second portion of the movable connecting member is disposed in the second passage in a manner preventing movement of the second portion into the first passage and allowing movement of the second portion farther into the second passage. A force transmitting member is connected with the movable member and operates to direct force against the first liquid containing component and toward the second liquid containing component when at least the second passage contains the pressurized liquid. In this regard, the movable connecting member acts as a piston under the force of the pressurized liquid and a second portion of the connecting member moves farther into the second passage thereby pulling the force transmitting member toward the first liquid containing component and also pulling the first liquid containing component against the second liquid containing component to achieve the connected relation referred to above.

In the preferred embodiment, the connector is further utilized to transfer liquid between the two liquid containing components. For this purpose, the movable connecting member includes a flow passage communicating between the first and second passages of the respective liquid containing components. In the preferred embodiment, for example, the second liquid containing component includes a liquid inlet passageway communicating with the second passage and the flow passage of the connecting member and the first liquid containing component includes an outlet passageway communicating with the first passage and the flow passage of the connecting member. In this manner, pressurized liquid flowing through the first and second liquid containing components, for example, to a downstream dispensing outlet, simultaneously pressurizes at least the second passage and, more preferably, the first and second passages to facilitate the hydraulic connecting function as described above. Alternatively, a separate liquid transfer path may be established between the two liquid containing components and the connector of this invention may be used solely for its connecting function and not for a liquid transferring function.

In the preferred embodiment, the force transmitting member is a spring-biased member connected with the movable connecting member. The spring-biased force transmitting member bears against an outer surface of the first liquid containing component to transmit the force as described above. The movable connecting member includes a portion extending outwardly from the first liquid containing component and the spring-biased member is selectively attachable to -that extending portion. More specifically, the spring-biased member is a one-piece spring clip that may be easily engaged and disengaged with the extending portion of the movable connecting member. The movable connecting member has a stepped diameter that increases in a direction extending from the first liquid containing component to the second liquid containing component and the first and second aligned passages in the first and second liquid containing components correspondingly increase in diameter. This causes hydraulic pressure to move the connecting member, in the manner of a piston, in a direction toward the increased diameter portions of the first and second aligned passages and movable connecting member. This provides a secure connection at the interface between the two liquid containing components.

A first pair of seal members is disposed between the first liquid containing component and the movable connecting member on opposite sides of the first, e.g., outlet liquid passageway and a second pair of seal members is disposed between the second liquid containing component and the movable connecting member on opposite sides of the second, e.g., inlet liquid passageway. The first and second pairs of seal members maintain liquid pressure within the aligned first and second passages and facilitate application of the necessary hydraulic pressure against the movable connecting member.

In a preferred embodiment, the first liquid containing component is connected for fluid communication with one or more dispensing outlets which may or may not be part of a separate dispenser, such as a gun. It will be appreciated that many other types of pressurized liquid dispensing or liquid transfer systems will benefit from the inventive principles as well.

As summarized above, and further detailed below, the present invention generally provides a quick connecting and disconnecting assembly for two liquid containing components that does not require threaded fasteners or other complicated fastening systems and which may be used to easily remove, repair and replace liquid containing components, such as manifolds or other internally pressurizable members. Moreover, the present invention utilizes the existing liquid pressure in the two connected liquid containing components to facilitate secure connection between two components and to eliminate the need for a compression loaded seal or face seal to contain the liquid within the components.

Additional features, objectives and advantages will become more readily apparent to those of ordinary skill in the art upon review of the following detailed description of the preferred embodiment, taken in conjunction with the accompanying drawings.

DETAILED DESCRIPTION OF THE PREFERRED EMBODIMENT

Figure 1:
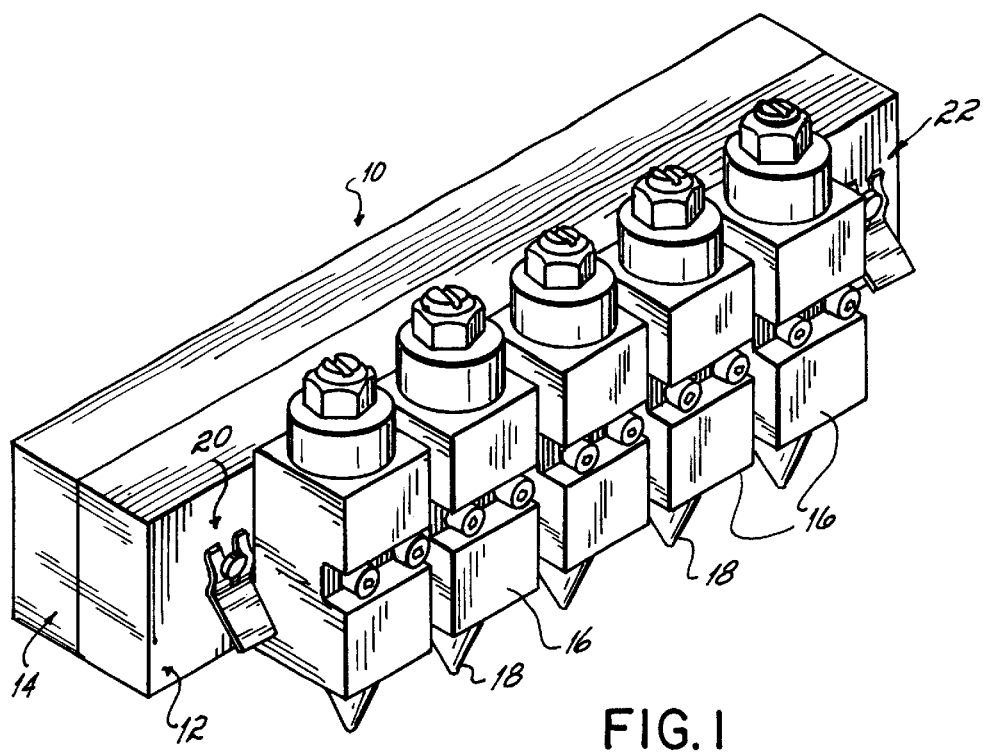
FIG. 1 a perspective view of one preferred liquid dispensing apparatus incorporating a connecting assembly in accordance with the invention.
Figure 2:
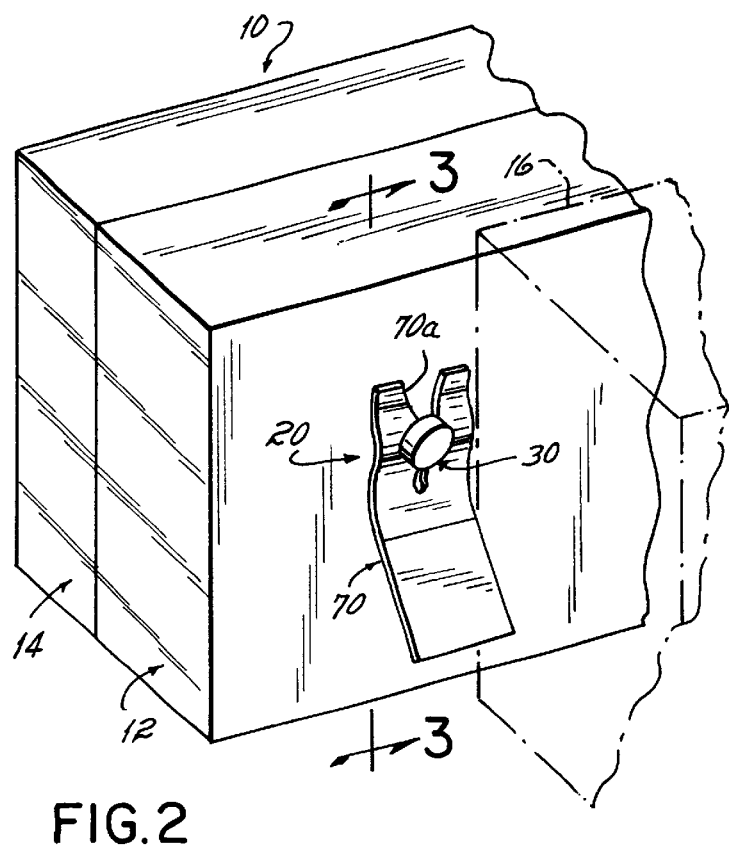
FIG. 2 is an enlarged and fragmented perspective view of the outside portion of one connecting assembly from FIG. 1.

Referring generally to FIGS. 1 and 2, an apparatus 10 for dispensing liquids, such as hot melt adhesives, is shown and generally includes a first liquid containing component 12, a second containing component 14 and a plurality of dispensing guns 16 connected to first liquid containing component 12. Although apparatus 10 is generally configured to dispense liquids, such as hot melt adhesives, the invention is applicable to many other pressurized liquid systems. In the illustrated embodiment, components 12, 14 receive pressurized liquid and distribute the liquid to one or more guns, such as guns 16. Alternatively, component 12 may directly incorporate other dispensing elements, such as nozzles, orifices, slots, etc., that facilitate the dispensing of liquid in any desired form. Therefore, it will be understood that the use of dispensing guns 16 is only one of many options for dispensing apparatus constructed in accordance with the inventive principles. Also, components 12, 14 may take many different forms and, in this regard, the block shape shown herein is only illustrative.

Apparatus 10 includes at least one quick disconnect assembly and, in the embodiment shown, two quick disconnect assemblies 20, 22 used to connect liquid containing components 12, 14 together in an easily engageable and disengageable manner. It will be appreciated that certain applications may require only one quick disconnect assembly in accordance with the invention, while other applications may require more than one quick disconnect assembly. The quick disconnect assembly of this invention may also be used in conjunction with other fastening structures in a pressurized liquid dispensing or transferring apparatus.

Figure 3:
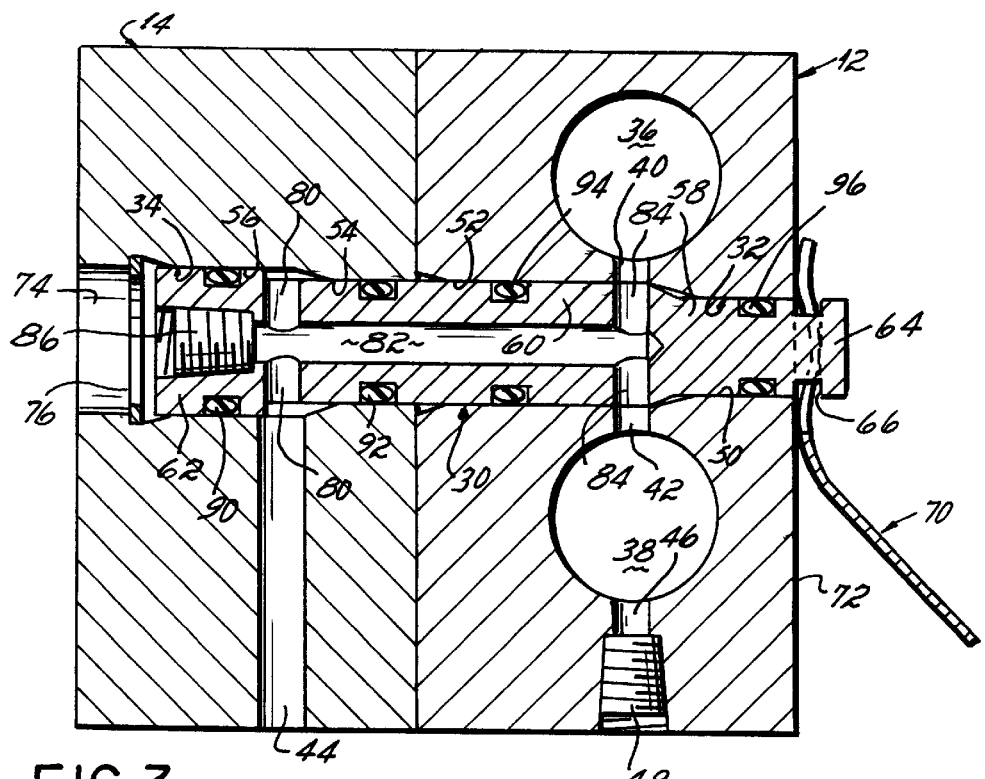
FIG. 3 is a cross sectional view taken along line 3—3 of FIG. 2, and showing the quick disconnect assembly in an unpressurized condition.
Figure 3A:
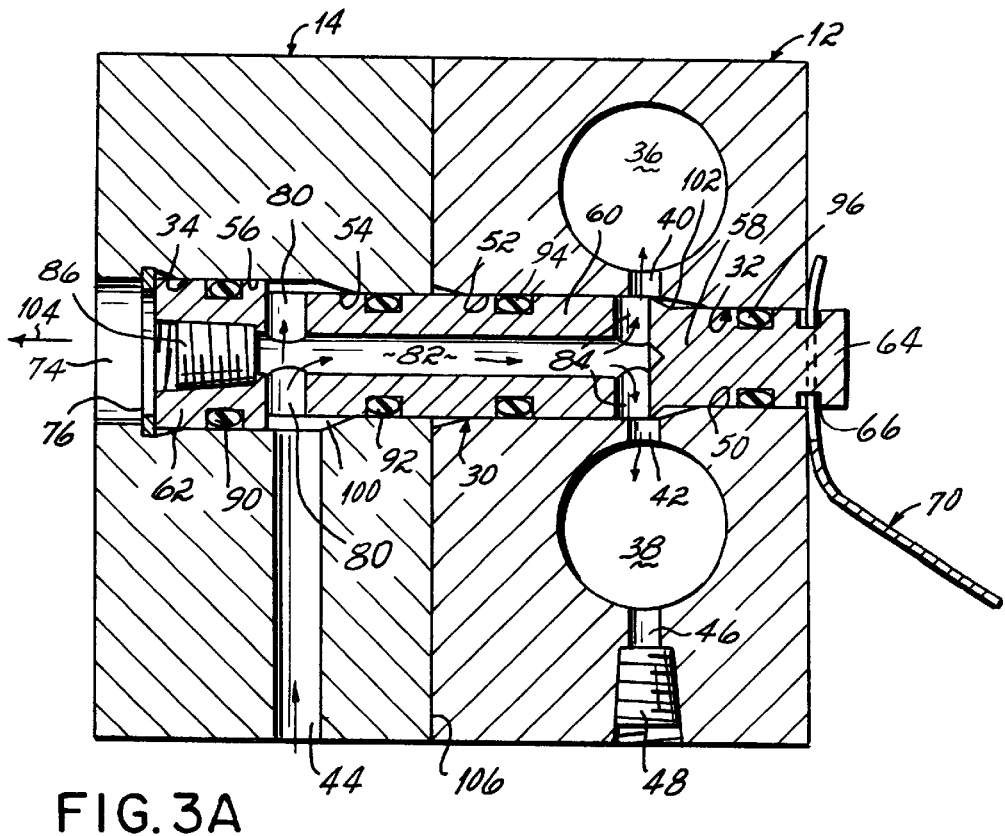
FIG. 3A is a cross sectional view similar to FIG. 3, but showing the quick disconnect assembly in a pressurized condition.
Figure 3B:
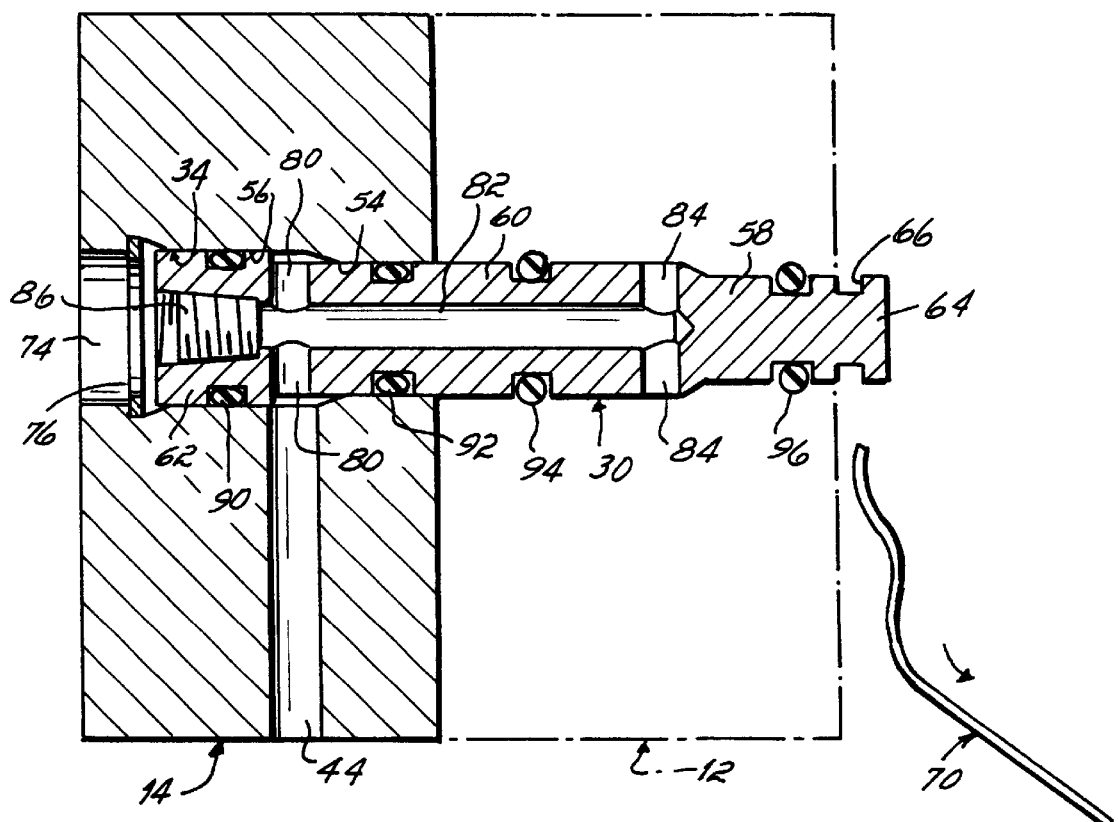
FIG. 3B is a cross sectional view similar to FIG. 3, but showing the quick disconnect assembly in a disconnected condition.

FIGS. 3, 3A and 3B illustrate the internal construction of quick disconnect assembly 20, as well as its operation. Assembly 22 may be constructed in an identical manner. Specifically, a movable connecting member 30 is contained within a pair of aligned passages 32, 34 contained respectively in components 12, 14. Liquid containing component 12 further includes a plurality of liquid passageways 36, 38, 40, 42, 46 for distributing liquid, such as hot melt adhesive, to any number of different types of downstream dispensing outlets. One option is outlets 18 of guns 16 as described with respect to FIG. 1. Liquid containing component 12 may include a greater or fewer number of liquid passageways, depending on the application. Likewise, liquid containing component 14 also includes at least one liquid passageway 44 for receiving a liquid. The liquid passageways must be pressurizable with a liquid during use of the apparatus. For typical hot melt adhesive dispensing devices, a maximum operating pressure is about 1,500 psi. Component 12 further includes a passageway 46 sealed with a threaded plug 48.

Aligned passages 32, 34, which contain movable member 30, include respective stepped diameter sections 50, 52 and 54, 56 which increase in diameter for reasons to be discussed below. Likewise, movable member 30 includes corresponding stepped diameter sections 58, 60, 62 which increase in diameter. Section 58 is the smallest in diameter and is received within section 50 of port 32. Section 60 of movable member 30 is of intermediate diameter and is contained within intermediate diameter sections 52, 54 of aligned passages 32, 34. Section 62 of movable member 30 is the largest in diameter and is contained within section 56 of passage 34. An end portion 64 of movable member 30 extends outwardly from passage 32 of component 12 and includes an annular recess 66 for receiving a spring clip 70. Spring clip 70 acts as a force transmitting member and bears directly against an outer surface 72 of liquid containing component 12 to hold components 12, 14 together. It may also bear indirectly against component 12 as long as force is transferred in the intended manner. An opposite end of movable member 30 is prevented from moving out of an opposite end section 74 of passage 34 by a retaining clip 76.

Movable member 30 includes a first plurality of radial passages 80 communicating with inlet passageway 44 of liquid containing component 14 and further communicating with a longitudinal flow passage 82 extending within movable member 30. A second plurality of radial passages 84 communicates between longitudinal flow passage 82 and passageways 36, 40 as well as passageways 38, 42 within liquid containing component 12. A threaded plug 86 closes the end of longitudinal flow passage 82. Respective seal members 90, 92, 94, 96, which may be O-rings retained around the cylindrical outer surface of movable member 30, are respectively disposed on opposite sides of radial passages 82 and 84. These O-rings 90, 92 and 94, 96 retain pressurized liquid within liquid containing components 12, 14 without requiring any compression seal or face seal between components 12, 14.

Pressurized liquid, such as hot melt adhesive, enters passageway 44 of liquid containing component 14 and then enters movable member 30 through radial passages 80. This also fills an annular cavity 100 between seal members 90, 92. The liquid moves along member 30 through longitudinal flow passage 82 and enters liquid containing component 12. Specifically, the liquid travels through radial passages 84, as well as passageways 40, 42 and 36, 38 within liquid containing component 12. The pressurized liquid also fills an annular cavity 102 located between seal members 94 and 96. The difference in diameter between seal members 94, 96 and seal members 90, 92 causes hydraulic pressure to move member 30, in the manner of a piston, in the direction of arrow 104. This movement loads spring clip 70 in the same direction against the outer surface 72 of liquid containing component 12 causing compression of components 12, 14 at their interface 106.

As shown in FIG. 3A, the hydraulic load tends to flatten spring clip 70 against the face 72 of liquid containing component 12. This is shown in somewhat exaggerated form in FIG. 3A. The respective dimensions between the end of movable member 30 and retaining clip 76 and the deflection range of clip 70 should be as equivalent as machining tolerances allow so that when liquid containing component 12 is placed on movable member 30, the movable member 30 cannot slide inwardly far enough to prevent access to annular recess 66. This allows a slot 70a of clip 70 to slide into annular recess 66, as best shown in FIG. 2, even when movable member 30 abuts against retaining clip 76. As hydraulic pressure within the various liquid passageways and passages increases, movable member 30 is forced to move in the direction of arrow 104 unless or until it stops against retaining clip 76. Preferably, sufficient spring force is designed into spring clip 70 to securely mate liquid containing components 12, 14 at interface 106.

As further shown in FIG. 3B, to replace or repair liquid containing component 12, for example, the hydraulic pressure within the various passageways and passages of apparatus 10 is removed and, subsequently, the operator removes clip 70. Liquid containing component 12 may then be easily slid off of movable member 30 and replaced after maintenance or repair. Optionally, liquid containing component 12 may be replaced with a new liquid containing component. Clip 70 is then reinserted and apparatus 10 may be again pressurized and operated in accordance with its intended use.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

The scope of the invention itself should only be defined by the appended claims, wherein I claim:

1. Apparatus having a hydraulic pressure loaded connector, the apparatus comprising:
    a first liquid containing component including a first passage,
    a second liquid containing component in fluid communication with said first liquid containing component when said liquid containing components are in connected relation, said second liquid containing component including a second passage,
    a movable connecting member having first and second portions respectively contained in the first and second passages, the second portion of said movable connecting member being disposed in the second passage in a manner preventing movement of the second portion into the first passage and allowing movement of the second portion farther into the second passage,
    a force transmitting member connected with said movable connecting member and operable to direct force against the first liquid containing component and toward the second liquid containing component when at least the second passage contains said pressurized liquid, whereby said movable connecting member acts as a piston under the force of said pressurized liquid and the second portion moves farther into the second passage thereby pulling the force transmitting member toward the first liquid containing component and pulling the first liquid containing component against the second liquid containing component to achieve the connected relation.

2. The apparatus of claim 1, wherein said force transmitting member is spring-biased, said spring-biased force transmitting member bearing against an outer surface of said first liquid containing component to transmit force thereto when the second passage contains said pressurized liquid.

3. The apparatus of claim 2, wherein the first portion of said movable connecting member extends outwardly from said first liquid containing component and said spring-biased force transmitting member is attachable to said first portion to achieve the connected relation and is detachable from said first portion to disconnect said first and second liquid containing components upon release of the pressure associated with said pressurized liquid.

4. The apparatus of claim 3, wherein said spring-biased force transmitting member is a one-piece spring clip.

5. The apparatus of claim 1, wherein said movable connecting member includes first and second ends and a length therebetween, the movable connecting member having a stepped diameter that increases between the first and second ends such that pressurized liquid in at least the second passage forces the second portion of said movable connecting member to move farther into the second passage causing the force transmitting member to direct said force against the first liquid containing component.

6. The apparatus of claim 5, wherein the first and second passages together define a stepped diameter passage corresponding to the stepped diameter of said movable connecting member, and stepped portions of said stepped diameter passage and said movable connecting member engage one another to prevent movement of the second portion of said movable connecting member into the first passage and allow movement of the second portion farther into the second passage.

7. The apparatus of claim 1, wherein said movable connecting member includes at least one flow passage communicating between the first and second passages of said first and second liquid containing components to transfer the pressurized liquid therebetween.

8. The apparatus of claim 7 further comprising:
    a first liquid passageway in the first liquid containing component, said first liquid passageway communicating with said first passage and said flow passage, and a second liquid passageway in the second liquid containing component, said second liquid passageway communicating with said second passage and said flow passage, whereby said pressurized liquid may flow from one of said first and second liquid passageways to the other of said first and second liquid passageways through said flow passage.

9. The apparatus of claim 8 further comprising:

a first pair of seal members disposed between said first liquid containing component and said movable connecting member on opposite sides of said first liquid passageway, and a second pair of seal members disposed between said second liquid containing component and said movable connecting member on opposite sides of said second liquid passageway, said first and second pairs of seal members maintaining liquid pressure within said aligned first and second passages.

10. The apparatus of claim 9, wherein one of said first and second liquid passageways is an inlet passageway to said first and second passages and the other of said first and second liquid passageways is an outlet passageway from said first and second passages, and further comprising at least one liquid dispensing outlet connected for communication with said outlet passageway.

11. The apparatus of claim 10, wherein said liquid dispensing outlet is part of a dispensing gun connected for communication with said outlet passageway.

12. Apparatus having a hydraulic pressure loaded connector and liquid transfer assembly, the apparatus comprising:

a first liquid containing component including a first passage for receiving a pressurized liquid, a second liquid containing component disposed adjacent the first liquid containing component and including a second passage for receiving said pressurized liquid, the second passage being aligned with the first passage when said liquid containing components are in connected relation, an elongate, movable connecting member having first and second portions respectively contained in the first and second passages and having a stepped portion that engages a stepped portion of at least one of the first and second passages to prevent movement of the second portion into the first passage and allow movement of the second portion farther into the second passage, said movable connecting member further including at least one flow passage communicating between the first and second passages for transferring the pressurized liquid between said first and second liquid containing components, a force transmitting member connected with said movable connecting member and operable to direct force against the first liquid containing component and toward the second liquid containing component when the first and second passages and the flow passage contain said pressurized liquid, whereby said movable connecting member acts as a piston under the force of said pressurized liquid and the second portion moves farther into the second passage thereby pulling the force transmitting member toward the first liquid containing component and pulling the first liquid containing component against the second liquid containing component to achieve the connected relation.

13. The apparatus of claim 12, wherein said force transmitting member is spring-biased, said spring-biased force transmitting member bearing against an outer surface of said first liquid containing component to transmit force thereto when said first and second passages and said flow passage contain said pressurized liquid.

14. The apparatus of claim 12, wherein the first portion of said movable connecting member extends outwardly from said first liquid containing component and said force transmitting member is attachable to said portion to achieve the connected relation and detachable to disconnect said first and second liquid containing components upon release of the pressure associated with said pressurized liquid.

15. The apparatus of claim 14, wherein said force transmitting member is a one-piece spring clip.

16. The apparatus of claim 12, wherein said first and second passages each have stepped portions corresponding to respective stepped portions of said movable connecting member, said stepped portions of said first and second passages respectively engaging the stepped portions of said connecting member to prevent movement of the second portion of said movable connecting member into the first passage and allow movement of the second portion farther into the second passage.

17. The apparatus of claim 12 further comprising:

a first liquid passageway in the first liquid containing component, said first liquid passageway communicating with said first passage and said flow passage, and a second liquid passageway in the second liquid containing component, said second liquid passageway communicating with said second passage and said flow passage, whereby said pressurized liquid may flow from one of said first and second liquid passageways to the other of said first and second liquid passageways through said flow passage.

18. The apparatus of claim 17 further comprising:

a first pair of seal members disposed between said first liquid containing component and said movable connecting member on opposite sides of said first liquid passageway, and a second pair of seal members disposed between said second liquid containing component and said movable connecting member on opposite sides of said second liquid passageway, said first and second pairs of seal members maintaining liquid pressure within said aligned passages.

19. The apparatus of claim 17, wherein one of said first and second liquid passageways is an inlet passageway to said first and second passages and the other of said first and second liquid passageways is an outlet passageway from said first and second passages, and further comprising at least one liquid dispensing outlet connected for communication with said outlet passageway.

20. The apparatus of claim 19, wherein said liquid dispensing outlet is part of a dispensing gun connected for communication with said outlet passageway.

21. A method of connecting first and second pressurized liquid containing component s together, the method comprising:

placing a movable member in respective first and second aligned passages of said first and second liquid containing components such that the first liquid containing component is releasably disposed on a first portion thereof and the second liquid containing component is held to a second portion thereof for limited movement with respect to said first liquid containing component, coupling a force transmitting member to the first end portion to prevent removal of said first liquid containing component from said connecting member, and introducing said pressurized liquid into at least the second passage and against the movable member to force the movable member farther into the second passage and simultaneously urge the force transmitting member against the first liquid containing component and the first liquid containing component against the second liquid containing component thereby securely coupling the first and second liquid containing components together.

22. The method of claim 21 further comprising:

directing said pressurized liquid between said first and second passages through said movable member.

23. The method of claim 21 further comprising:

urging said force transmitting member against the first liquid containing component under a spring bias.

* * * * *